(12) United States Patent
Zhang et al.

(10) Patent No.: US 6,417,964 B1
(45) Date of Patent: Jul. 9, 2002

(54) RECONFIGURABLE AUTOMATIC GAIN CONTROL AND METHOD FOR OPTICAL AMPLIFIER

(75) Inventors: Lintao Zhang, Richardson; Charles Mao, Plano, both of TX (US); Xiaofan Cao, Fremont, CA (US); Guohua Xiao, Plano, TX (US)

(73) Assignee: Avamex Corporation, Fremont, CA (US)

( * ) Notice: Subject to any disclaimer, the term of this patent is extended or adjusted under 35 U.S.C. 154(b) by 0 days.

(21) Appl. No.: 09/777,162

(22) Filed: Feb. 5, 2001

(51) Int. Cl.[7] .......................... H04B 10/12; H04B 10/06
(52) U.S. Cl. ........................ 359/341.41; 359/341.4; 359/194
(58) Field of Search .................. 359/341.4, 341.41, 359/341.42, 341.43, 341.44, 117, 143, 147, 160, 164, 177, 173, 179, 194

(56) References Cited

U.S. PATENT DOCUMENTS

| | | | |
|---|---|---|---|
| 5,296,957 A | * | 3/1994 | Takahashi et al. .......... 359/166 |
| 5,726,788 A | * | 3/1998 | Fee et al. .................... 359/118 |
| 6,038,063 A | * | 3/2000 | Tsuda et al. ................ 359/124 |
| 6,069,731 A | * | 5/2000 | Bayart ...................... 359/341.41 |
| 6,229,641 B1 | * | 5/2001 | Kosaka ........................ 359/161 |
| 6,260,073 B1 | * | 7/2001 | Walker et al. .............. 370/412 |
| 6,266,169 B1 | * | 7/2001 | Tomooka et al. ........... 359/110 |
| 6,275,329 B1 | * | 8/2001 | Sieben ........................ 359/177 |

FOREIGN PATENT DOCUMENTS

WO   WO 99/67609   * 6/1999   ............. G01J/3/18

* cited by examiner

Primary Examiner—Thomas H. Tarcza
Assistant Examiner—Andrew R. Sommer
(74) Attorney, Agent, or Firm—Fernandez & Associates, LLP

(57) ABSTRACT

A reconfigurable AGC loop design for an optical amplifier with a software provisional switch in the AGC loop inside the optical amplifier is disclosed. On the input side, there is a 1×m switch for switching a first input to the input of an optical amplifier, or to route other external pins to the optical amplifier. On the output side, there is a 1×n switch for switching a first output to the output of an optical amplifier, or to route other external pins to the optical amplifier. The AGC loop inside an optical amplifier is available to operate with other external signals. This reconfigurability unleashes the AGC loop capability that is traditionally confined to individual optical amplifier, provides flexibility, and greatly simplifies the design of optical node.

8 Claims, 3 Drawing Sheets

RECONFIGURABLE AUTOMATIC GAIN CONTROL AND METHOD FOR OPTICAL AMPLIFIER

BACKGROUND INFORMATION

1. Field of the Invention

The present invention relates generally to the field of optical networks, and particularly to gain control in an optical amplifier.

2. Description of Related Art

Optical amplifier is a major network element for dense wavelength division multiplexer (DWDM) optical networks. It boosts the optical signal power without the need to convert all DWDM channels back to electrical domain and back to optical domain. As development unfolds, optical nodes are emerging as the building block for optical networks. Optical nodes amplify, perform dispersion management, monitor optical performance, and manipulate wavelengths, such as an optical add drop multiplexer (OADM) and/or an optical cross connect (OXC), in optical domain. Optical amplifiers operates as building blocks in constructing an optical node. As DWDM networking progresses, more intelligent optical amplifiers are needed so that cost-effective, fully scalable, and automatic provisional services can be delivered.

Conventional optical amplifiers operate in constant output power with automatic level control (ALC) loop, and/or constant gain with automatic gain control (AGC) loop. When an amplifier operates in AGC mode, it compares its input and output power and control the pump laser power so that the amplifier gain, i.e. the ratio between output and input, is constant. AGC is commonly required for DWDM system amplifiers, since it ensures that each DWDM channel receives same amount of gain from optical amplifier irrespective to the number of input channels into the amplifier. A shortcoming of this approach is that the AGC is limited to amplifier's own input and output. As DWDM network node evolves, more than one optical amplifiers are needed for one network node. And AGC needs to be configured across all amplifiers in one node. Accordingly, the present invention addresses these needs.

SUMMARY OF THE INVENTION

The invention provides a reconfigurable AGC loop design for an optical amplifier with a software provisional switch in the AGC loop inside the optical amplifier. On the input side, there is a 1×m switch for switching a first input to the input of an optical amplifier, or to route other external pins to the optical amplifier. On the output side, there is a 1×n switch for switching a first output to the output of an optical amplifier, or to route other external pins to the optical amplifier. The AGC loop inside an optical amplifier is available to operate with other external signals. This reconfigurability unleashes the AGC loop capability that is traditionally confined to individual optical amplifier.

Advantageously, the present invention provides a greater flexibility in the operation of an optical node for interfacing with external pins. The present invention further advantageously simplifies the design of an optical node significantly.

Other structures and methods are disclosed in the detailed description below. This summary does not purport to define the invention. The invention is defined by the claims

DETAILED DESCRIPTION OF PREFERRED EMBODIMENT(S)

Figure 1:
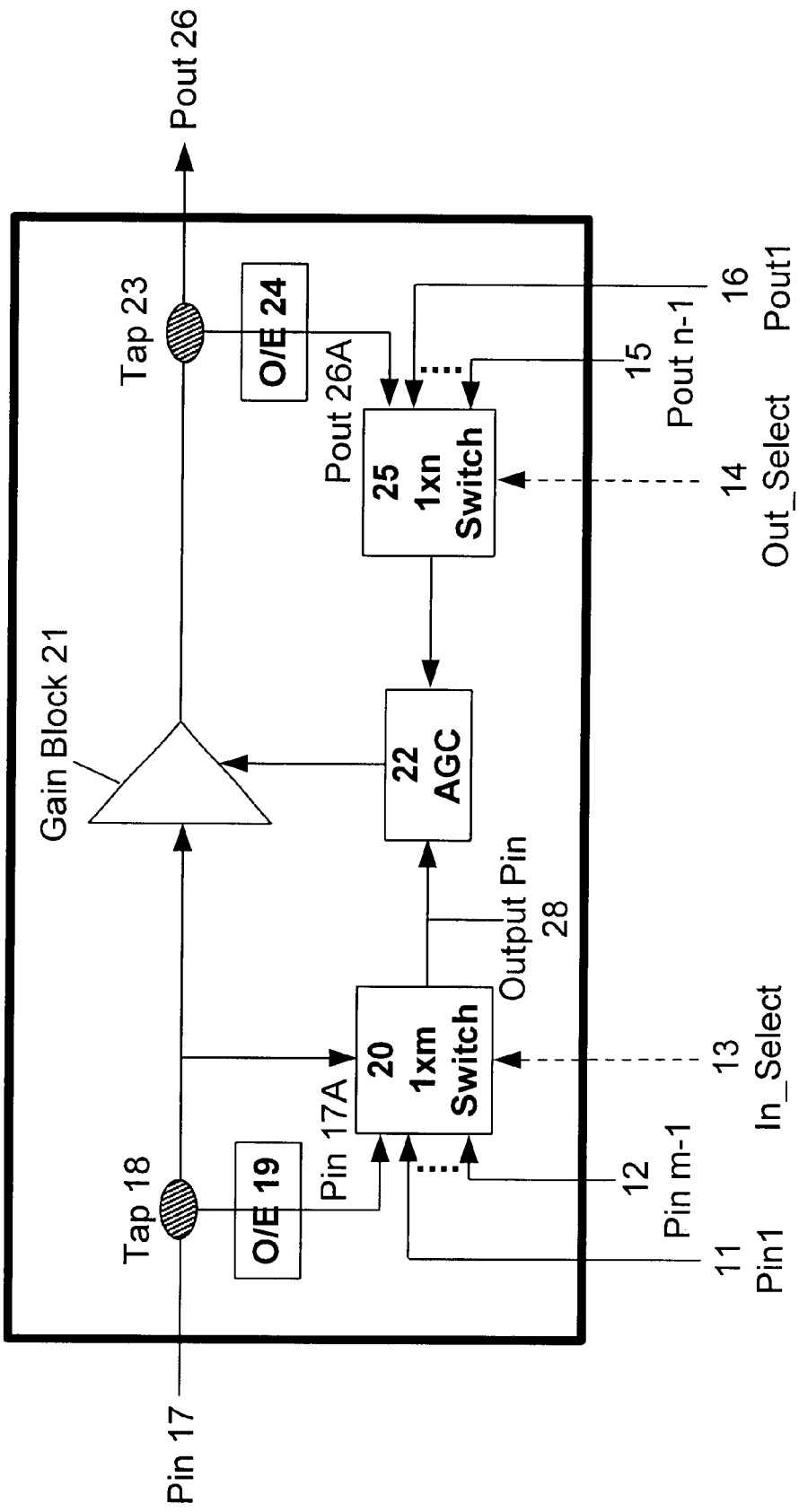
FIG. 1 is an architectural diagram illustrating a reconfigurable automatic gain control loop for an optical amplifier in accordance with the present invention.

FIG. 1 is an architectural diagram illustrating a reconfigurable automatic gain control (AGC) loop 10 for an optical amplifier. An input optical signal 17 is tapped off 18 and converted to an electrical analog signals via optical-to-electrical (O/E) 19. An output optical is also tapped off 23 and converted to an electrical analog signal via an O/E 24. There are manalog signal inputs to the amplifier (Pin 17A+ Pin1 to Pin m−1), each representing some optical signal level. A 1×m electrical switch 20 is used to select, from Pin 17A and the m−1 12 input analog signals (Pin1 11 to Pin m−1 12), which one of the inputs will supply the input to the AGC loop of the optical amplifier. Similarly, a 1×n electrical switch 25 is used to select, from Pout 26A and the n−1 15 input analog signals (Pout1 16 to Pout n−1 15), which one of will be the output for the AGC loop of the optical amplifier. Both switches are controlled by soft/firm-ware through their address lines (In_Select 13, and Out_Select 14, respectively). The AGC 22 controls the pump power to the amplifier 21 to ensure that the gain between input and output is constant.

Therefore, two selection switches, the 1×m switch 20 and the 1×n switch 25, are added, to the reconfigurable gain loop 10. Both the 1×m switch 20 and the 1×n switch 25 can be adjusted by software. The digital signal on the address line of the switch will determine which position the switch will turn on. This will ensure that it will operate according to its input or its output. The software can reconfigure the 1×m switch 20 and the 1×n switch 25, if desirable.

Figure 2:
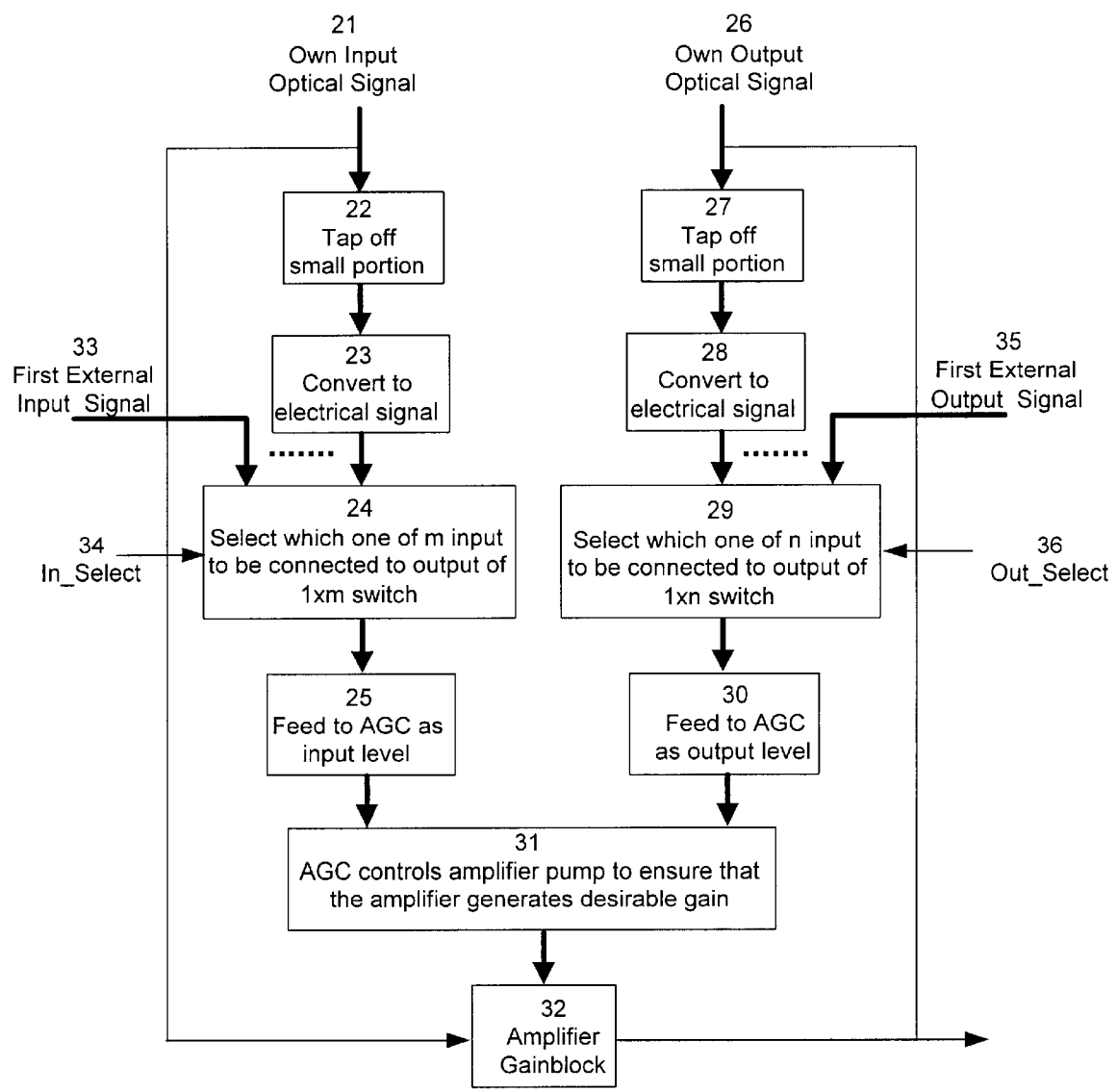
FIG. 2 is a flow diagram illustrating the process for operating a reconfigurable automatic gain control of an optical amplifier in accordance with the present invention.

FIG. 2 is a flow diagram illustrating the process 20 for operating a reconfigurable automatic gain control for an optical amplifier. To operate in an AGC loop, an input optical signal 21 is tapped off 22 and converted 23 to an electrical analog signal. Similarly, an output optical signal 26 is tapped off 27 and converted 28 to an electrical analog signal. On the input path, a first external input signal 33, as well as other external signals, are routed to the 1×m switch 24. An in_select signal 34 selects 24 which one of the m inputs is to be connected to the output of the 1×m switch 24. The selected input is feed 25 to the AGC 31 as an input level. On the output path, a first external output signal 35, as well as other external signals, are routed to the 1×n switch 29. An out_select signal 36 selects 29 which one of the n inputs is to be connected to the output of the 1×n switch 29. The selected input is feed 30 to AGC as an output level The AGC 31 compares the input and the output and decides if the gain is at a desirable level. As a result, the AGC 31 controls the amplifier pump to adjust a desirable gain if there is an error. The amplifier gain block 32 then generates an amplified output signal.

The in_select signal 34 is a digital port that can be generated from a source such as a microcontroller. For example, for 1×8, three control signals are required. Suppose the three control signals equal to a binary value of "000", this may be designated to correspond with a position 1, or a physical switch position 1. The input will get routed to the first input position. The other seven pins are accessible from an external device. The input switch will select the appropriate optical level. For example, if this amplifier is at the last stage of an optical node, the AGC will operate from an external input, rather than the input switch. Table 1 below illustrates a sample entry of pin 1 11 through pin m−1 12.

TABLE 1

| Binary Representation | Function |
| --- | --- |
| 000 | P17A |
| 001 | Pin1 11 |
| 010 | Pin2 |
| 011 | Pin3 |
| 100 | Pin4 |
| 101 | Pin5 |
| 110 | Pin6 |
| 111 | Pin7 12 |

Figure 3:
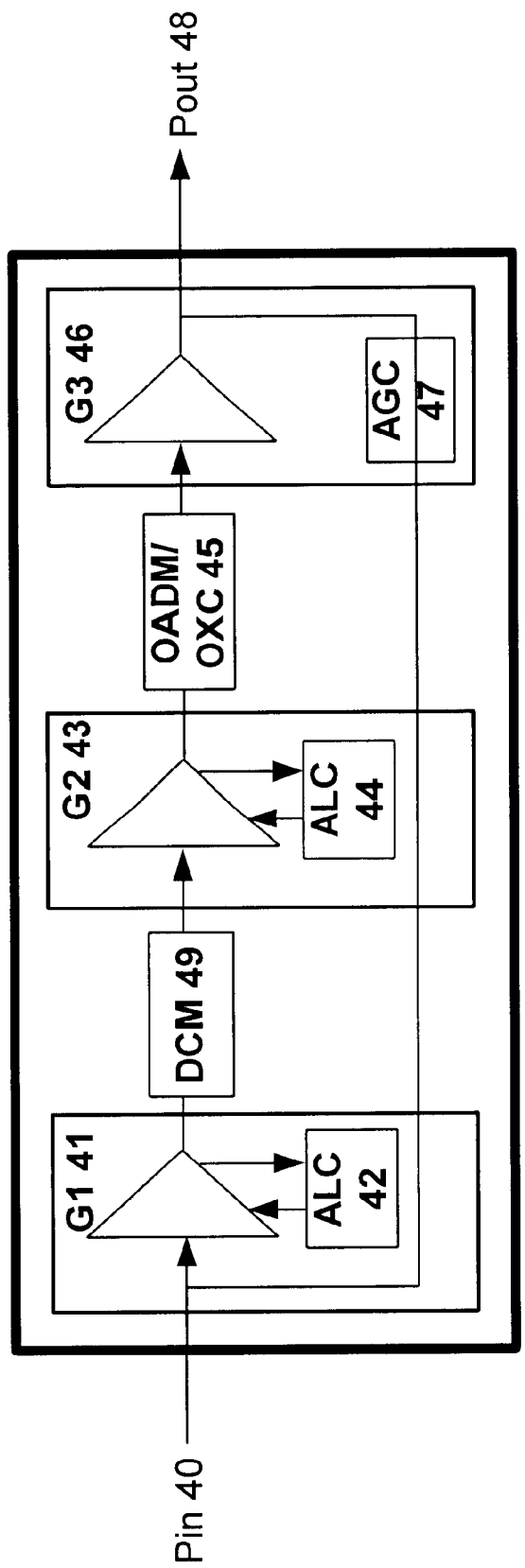
FIG. 3 is a logic diagram illustrating an example of an optical node using a reconfigurable AGC from optical amplifier in accordance with the present invention.

FIG. 3 is an architectural diagram illustrating an example of an optical node using a reconfigurable AGC for an optical amplifier. The optical node 40 comprises three optical amplifiers G1 41, G2 43, and G3 46 with a dispersion compensation module (DCM) 49 and an OADM/OXC 45 in between. Each individual amplifier the G1 41, the G2 43, and the G3 46 has its own ALC, AGC, and output electrical analog signals representing input and output optical power. An ALC 42 is coupled to the optical amplifier G1 41, an ALC 44 is coupled to the optical amplifier G2 43, and an AGC 47 is coupled to the optical amplifier G3 46 and G1 41. In this embodiment, the AGC 47 is needed for input and output signals to the optical node 40, i.e., input pin 40 to the G1 41 and output of the G3 46 to Pout 48, not the input and output to one individual amplifier G1 41 or G3 46. With this reconfigurable AGC design, input to the optical node 40 is coming directly from G1 analog signal (representing input to the G1 41) and is fed to one of analog input of the G3 46. The G3 46 can then select to perform the AGC 47 with this external input. The G1 41 and the G2 43 will set to operate in ALC mode at maximum output power, to ensure minimum noise degradation for overall optical node.

The above embodiments are only illustrative of the principles of this invention and are not intended to limit the invention to the particular embodiments described. For example, although the present invention illustrates one set of input pins, and one set of output pins, one of ordinary skill in the art should recognize that other combinations of pins or sets of pins intended for reconfigurability of an automatic gain control for an optical amplifier can be practiced without departing from the spirits in the present invention. Accordingly, various modifications, adaptations, and combinations of various features of the described embodiments can be practiced without departing from the scope of the invention as set forth in the appended claims.

We claim:

1. A reconfigurable automatic gain control system of an optical amplifier, comprising:

a 1×m switch, comprising:
at least one address line providing a value;
a plurality of inputs; and
an output, wherein, the value of the at least one address line designates which one of the inputs is connected to the output; and
an automatic gain control having a first input coupled to the 1×m switch, a second input, and an output.

2. The reconfigurable automatic gain control system of claim 1, further comprising a 1×n switch coupled to the second input of the automatic gain control.

3. The reconfigurable automatic gain control system of claim 1, further comprising a gain block coupled to the output of the automatic gain control.

4. The reconfigurable automatic gain control system of claim 1, further comprising a first optical-to-electrical converter, coupled to the 1×m switch, for converting an input optical signal to an electrical signal.

5. The reconfigurable automatic gain control system of claim 2, further comprising a second optical-to-electrical converter, coupled to the 1×n switch, for converting an input optical signal to an electrical signal.

6. A method for reconfiguring an automatic gain control system of an optical amplifier, comprising:

selecting an input from a plurality of inputs in a 1×m switch;

selecting an output from a plurality of outputs in a 1×n switch; and reconfiguring an automatic gain control by selecting the input from the plurality of inputs to the 1×m switch.

7. The method of claim 6, wherein the selecting an input step comprises providing a signal to the 1×m switch through a first address line.

8. The method of claim 7, wherein the selecting output step comprises providing a signal to the 1×n switch through a second address line.

* * * * *

UNITED STATES PATENT AND TRADEMARK OFFICE
CERTIFICATE OF CORRECTION

PATENT NO. : 6,417,964 B1
DATED : July 9, 2002
INVENTOR(S) : Zhang et al.

It is certified that error appears in the above-identified patent and that said Letters Patent is hereby corrected as shown below:

<u>Title page,</u>
Item [73], Assignee: Assignee name should be replaced with:
-- Avanex Corporation --

Signed and Sealed this

Fifth Day of November, 2002

*Attest:*

*Attesting Officer*

JAMES E. ROGAN
*Director of the United States Patent and Trademark Office*